UNITED STATES PATENT OFFICE.

FREDK. W. GOESSLING, OF JERSEY CITY, NEW JERSEY.

IMPROVED METHOD OF MAKING SUGAR FROM INDIAN CORN OR OTHER GRAIN.

Specification forming part of Letters Patent No. 49,750, dated September 5, 1865.

*To all whom it may concern:*

Be it known that I, FREDERICK W. GOESSLING, now of Jersey City, in the county of Hudson and State of New Jersey, have invented a new and Improved Method or Process of Manufacturing a Cane-Like Sugar from Indian Corn or Maize, which method or process is also applicable to all grains or cereals which contain amylum; and I do hereby declare that the following is a full and exact description thereof, to enable others skilled in the art to which it belongs to manufacture sugar according to the principles of my said invention and improvement.

*First degree.*—In the first place I take about three thousand pounds (3,000 lbs.) of Indian corn or maize (or other cereals containing amylum) and soak it in a suitable tank or vat in a caustic-alkali liquid of about 1.5 specific gravity, according to Baumé's alkalimeter, for about one week. Then I take this soaked corn or grain and crush it in suitable mills or rollers, and then sift this crushed mass of grain or maize in suitable sieves, and the milky substance which passes through the sieves I put into other tank or tanks and wash it by agitation in a weak alkaline water, and then allow it to settle, and then draw off the top liquid, and then wash it again in pure soft water, and then draw off the top liquid, leaving the milky mass at the bottom of the tank or vat. This milky mass is not commercial starch. It will and must have an alkali taste only sufficient to turn red litmus-paper blue. This constitutes the first degree or first step in my process.

*Second degree.*—I now have prepared and ready for use another suitable tank or vat, in which there is placed a lead pipe, running back and forth over the bottom of the tank, or in the form of a coil, one end of which lead pipe is connected with an iron pipe outside of the tank, and which iron pipe is connected with a steam-boiler, and the other end of the lead pipe is carried up out of the tank and opens into a barrel outside. Suitable stop-cocks are placed in this lead pipe to regulate and control the passage of steam through it. Into this tank or vat I put about two hundred pounds of pure soft water and about twenty-four pounds of sulphuric acid. Then I pass steam through this lead pipe, causing the acid-water in the tank to boil. Then I mix with the milky substance (before described in the first degree of my process) so much pure soft water as will reduce it to the consistency of thin sirup. Then I pass this milky substance into the boiling acid-water above mentioned so slowly and gradually as will not stop the boiling, and after it is all in I keep it slowly to the boiling-point for about six hours. Then I shut off the steam and stop the boiling, and add to the boiled mass about ten pounds (10 lbs.) of fine pulverized animal (or lichen) carbon or its equivalent, (animal-carbon being used by preference,) and then add very gradually about twenty pounds of fine pulverized carbonate of lime (this may be added dry or mixed with water) and about one and one half pound of terra-alba or gypsum, and boil it all up together for about five minutes. Then I put in about ten pounds more of fine pulverized carbonate of lime, as above, which will thoroughly neutralize the whole mass. After the neutralization as aforesaid, I put into the mass about twenty pounds (20 lbs.) more of the fine pulverized animal-carbon or equivalent, and then boil the whole mass for about five minutes, and then filter it through suitable cloth filters, which liquid, by so doing, becomes a cane-like sugar-liquid. This sugar-liquid is then put into suitable tanks or vats having leaden pipes therein, substantially as above described, and mix therewith about one per cent. of prepared carbonate of quicklime and about two per cent. of bullock's blood, and then turn on steam and heat the mass gradually up to the boiling-point. During the heating nearly all the impure stuff will rise to the top, which is skimmed off, and the sugar-liquid is filtered through coarsely-powdered animal-charcoal. Then I put the sugar-liquid into a vacuum, and then the further treatment thereof is such as is commonly practiced by cane-sugar refiners up to the point where the sugar is taken out of the conical molds for drying, at which point I put it upon gypsum shelves for drying. When sufficiently dried the whole process is complete, and the product is about twenty-four pounds of cane-like sugar from one bushel of Indian corn or maize.

What I claim as my invention, and desire to secure by Letters Patent, is—

1. The method or process of manufacturing sugar from Indian corn or maize and other cereal grains containing amylaceous matter in each or either step or degree thereof, substantially as described.

2. A cane-like sugar produced from Indian corn or maize, as a new product of manufacture, by the method or process substantially as described.

FREDERICK W. GOESSLING.

Witnesses:
W. E. JILLSON,
E. B. FORBUSH.